United States Patent
Hofmann et al.

(10) Patent No.: US 7,177,625 B2
(45) Date of Patent: Feb. 13, 2007

(54) METHOD AND RADIO COMMUNICATION SYSTEM FOR TRANSMITTING USEFUL INFORMATION AS A SERVICE FOR SEVERAL USER STATIONS

(75) Inventors: Jürgen Hofmann, Merching (DE); Jörg Schniedenharn, Bonn (DE); Lars Wehmeier, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/513,502

(22) PCT Filed: Apr. 30, 2003

(86) PCT No.: PCT/EP03/04576

§ 371 (c)(1),
(2), (4) Date: May 20, 2005

(87) PCT Pub. No.: WO03/094560

PCT Pub. Date: Nov. 13, 2003

(65) Prior Publication Data

US 2005/0204390 A1 Sep. 15, 2005

(30) Foreign Application Priority Data

May 6, 2002 (EP) .................................. 02010088

(51) Int. Cl.
H04M 1/66 (2006.01)
H04M 1/68 (2006.01)
H04M 3/16 (2006.01)

(52) U.S. Cl. ................ 455/410; 455/414.1; 455/414.3; 713/170; 713/171

(58) Field of Classification Search ................ 455/410, 455/414.1, 411, 406; 380/247, 250, 231, 380/232, 241, 258, 259, 277–285; 713/170–172, 713/176, 180, 185
See application file for complete search history.

(56) References Cited

U.S. PATENT DOCUMENTS

| 6,370,380 B1 * | 4/2002 | Norefors et al. ............ 455/436 |
| 6,711,157 B1 * | 3/2004 | Tang et al. ................. 370/352 |
| 2002/0049675 A1 | 4/2002 | Kailamaki et al. |
| 2004/0081192 A1 * | 4/2004 | Koulakiotis et al. ........ 370/432 |

FOREIGN PATENT DOCUMENTS

EP  1 164 804  12/2001

(Continued)

OTHER PUBLICATIONS

International Search Report mailed Jul. 4, 2003 for International Application No. PCT/EP03/04576.

*Primary Examiner*—Charles Appiah
*Assistant Examiner*—Jaime M. Holliday
(74) *Attorney, Agent, or Firm*—Staas & Halsey LLP

(57) ABSTRACT

In a radio communication system with at least one radio network control device, at least one base station is connected to at least one user station by a radio communication interface. The base station(s) and the radio network control device are components of a base station subsystem. The radio network control device is connected to an access device for a core network. The radio network control device and the user station(s) have a service specific key that is preferably valid for several user stations, or in other words, the service specific key is not user specific.

9 Claims, 1 Drawing Sheet

FOREIGN PATENT DOCUMENTS

| | | |
|---|---|---|
| EP | 1 164 804 A1 | 12/2001 |
| EP | 1168870 A1 * | 1/2002 |
| EP | 1 359 725 A2 | 11/2003 |
| NL | 1007409 | 11/1997 |
| WO | 99/01848 | 1/1999 |
| WO | 99/91848 | 1/1999 |

* cited by examiner

METHOD AND RADIO COMMUNICATION SYSTEM FOR TRANSMITTING USEFUL INFORMATION AS A SERVICE FOR SEVERAL USER STATIONS

CROSS REFERENCE TO RELATED APPLICATIONS

This application is based on and hereby claims priority to PCT Application No. PCT/EP03/04576 filed on Apr. 30, 2003 and European Patent Application 02010088.9, filed May 6, 2002, the contents of both of which are hereby incorporated by reference.

BACKGROUND OF THE INVENTION

1. Field of the Invention

The invention relates to a method for transmitting useful information in a radio communication system with at least one radio network control device, at least one base station and at least one user station.

2. Description of the Related Art

Communication systems are becoming increasingly important in both the economic and private spheres. Serious efforts are being made to link cable-based communication systems to radio communication systems. The resulting hybrid communication systems increase the number of available services and also allow greater flexibility in respect of communication. Devices are therefore being developed that can use different systems (multi-homing).

Radio communication systems are increasing in importance because of the mobility they allow users.

In radio communication systems information (e.g. voice, image information, video information, SMS [Short Message Service] and other data) is transmitted using electromagnetic waves via a radio interface between the sending and receiving stations (base station and user station). The electromagnetic waves are thereby emitted at carrier frequencies in the frequency band provided for the respective system.

Frequencies of 900, 1800 and 1900 MHz are used for the existing GSM mobile radio system (Global System for Mobile Communication). These systems essentially transmit voice, telefax and SMS (Short Message Service) as well as digital data.

Frequencies in the frequency band of approx. 2000 MHz are provided for future mobile radio systems with CDMA or TD/CDMA transmission methods, such as UMTS (Universal Mobile Telecommunication System) or other third generation systems. These third generation systems are being developed with the objectives of worldwide radio coverage, a wide range of services for data transmission and most importantly flexible management of the capacity of the radio interface, which is the interface with the fewest resources in radio communication systems. With these radio communication systems it should be possible for a user station to be able to send and/or receive a large quantity of data if required at a high data speed, primarily through flexible management of the radio interface.

Access by the stations to common radio resources of the transmission medium, e.g. time, frequency, output or space, is regulated in these radio communication systems by Multiple Access (MA) methods.

In the case of Time Division Multiple Access (TDMA) methods, each send and receive frequency band is divided into time slots, with one or several cyclically repeated time slots being allocated to the stations. TDMA separates the radio resource time in a station-specific manner.

In the case of Frequency Division Multiple Access (FDMA) methods, the overall frequency range is divided into narrow-band domains, with one or several narrow-band frequency bands being allocated to the stations. FDMA separates the radio resource frequency in a station-specific manner.

In the case of Code Division Multiple Access (CDMA) methods, a spread code using a large number of individual so-called chips is used to code the output/information to be transmitted in a station-specific manner, as a result of which the output to be transmitted is spread in a random manner based on the code over a large frequency range. The spread codes used by different stations within a cell/base station are orthogonal or essentially orthogonal in respect of each other in each instance, so the receiver identifies the signal output intended for it and suppresses other signals. CDMA separates the radio resource output in a station-specific manner using spread codes.

In the case of Orthogonal Frequency Division Multiplexing (OFDM) methods, the data undergoes broadband transmission with the frequency band divided into equidistant, orthogonal subcarriers, so that the simultaneous phase shift of the subcarriers generates a two-dimensional data flow in the time-frequency domain. OFDM separates the radio resource frequency in a station-specific manner using orthogonal subcarriers. The combined data symbols transmitted during a time unit on the orthogonal subcarriers are referred to as OFDM symbols.

Multiple access methods can be combined. Many radio communication systems therefore use a combination of the TDMA and FDMA methods, with each narrow-band frequency band divided into time slots.

For the UMTS mobile radio system referred to a distinction is made between a so-called FDD (Frequency Division Duplex) mode and a TDD (Time Division Duplex) mode. The TDD mode is characterized in particular in that a common frequency band is used both for signal transmission in the uplink UL and the downlink DL, while FDD mode uses a different frequency band for each of the two transmission directions.

In second and/or third generation radio communication connections information can be transmitted circuit switched CS or packet switched PS.

The connection between the at least one base station and the at least one user station is established via a radio communication interface. The at least one base station and radio network control device are components of a base station subsystem (RNS Radio Network Subsystem). A radio communication system generally includes several base station subsystems, which are linked to a core network CN. The radio network control device of the base station subsystem is thereby connected to an access device of the core network.

Data made available to several users is transmitted in radio communication systems as well as individual items of useful information. Such useful information includes video streams for example. Useful information, which is made available to several users, is combined under the term MBMS (Multimedia Broadcast/Multicast Service).

It is essentially of major importance for all network resources to be used as sparingly as possible. Efforts are made in particular to ensure that the radio network requires as little information as possible about the respective users, as otherwise a significant quantity of information potentially has to be stored in the radio network.

Radio communication systems interfacing with a core network are therefore known, with the following network nodes having important functions for transmission of the services:

the access device to the core network (SGSN Serving GPRS Support Node), which holds both service-specific and user-specific information, the radio network control device (RNC Radio Network Controller), which holds service-specific information.

SUMMARY OF THE INVENTION

An object of the invention is therefore to demonstrate a method and a radio communication system of the type mentioned above, which make sparing use of network resources. In particular it should be possible to judge in the radio communication system whether a specific user station can be permitted to access a service without the user station itself being known. It should also be possible to change cell as easily as possible.

According to the invention the radio network control devices and the user stations have a service-specific key, including the authorization to use the service.

Use of the key means that an authorization to access or use a service can be verified in the radio network for several users, without the radio network requiring user-specific information in respect of the service. A service-specific key is therefore preferably used, which is valid for several user stations and is not selected in a user-specific manner.

The access device of the core network advantageously transmits the service-specific key to both the radio network control device and the user station at the start of the service. This allows the signaling outlay to be kept low while the access authorization is transmitted securely to the devices in the radio network.

In one embodiment of the invention the service-specific key is transmitted via a user-specific radio channel from the base station to the user station. In this way it can be ensured that the key is transmitted to the user station via a secure connection and that no unauthorized user stations can use the service in an unauthorized manner.

The invention makes it possible for the access authorization of the user station to be verified in the event of a cell change within the radio network without there having to be an interaction with the access device to the core network. For in the event of a cell change in a radio cell, which is assigned to the same radio network control device, the access authorization of the user station is already known to the radio network control device. In the event that the user stations change to another radio cell, which is assigned to a further radio network control device, the user station can register with the further radio network control device using the service-specific key. This ensures that interaction with the access device of the core network can be avoided for every cell change. The service-specific key can be used by the user station during registration with the further radio network control device of the new radio cell or for encryption of the message, by using the key for integrity protection, by applying the key to the address of the user station or similar mechanisms. As the key used is known to the radio network control device, the radio network control device can judge whether the respective user station registered correctly with the access device of the core network at the start of the service.

In a development of the invention the service-specific key is held as the context of a service offered via the core network in the at least one radio network control device or in the radio network control devices, which support this service.

The service is preferably a multimedia service (e.g. video streams).

The service-specific key can be a temporary key or a permanent key. Selection of the type of key can thereby be based on security aspects for example.

With the inventive radio communication system, the radio network control device and the user station hold a service-specific key, which includes authorization to use the service.

The access device of the core network can transmit the service-specific key to both the radio network control device and the user station at the start of the service.

Preferably, the inventive radio communication system transmits the service-specific key from the base station to the user station via a user-specific radio channel.

The radio communication system described is particularly suitable for implementing the inventive method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
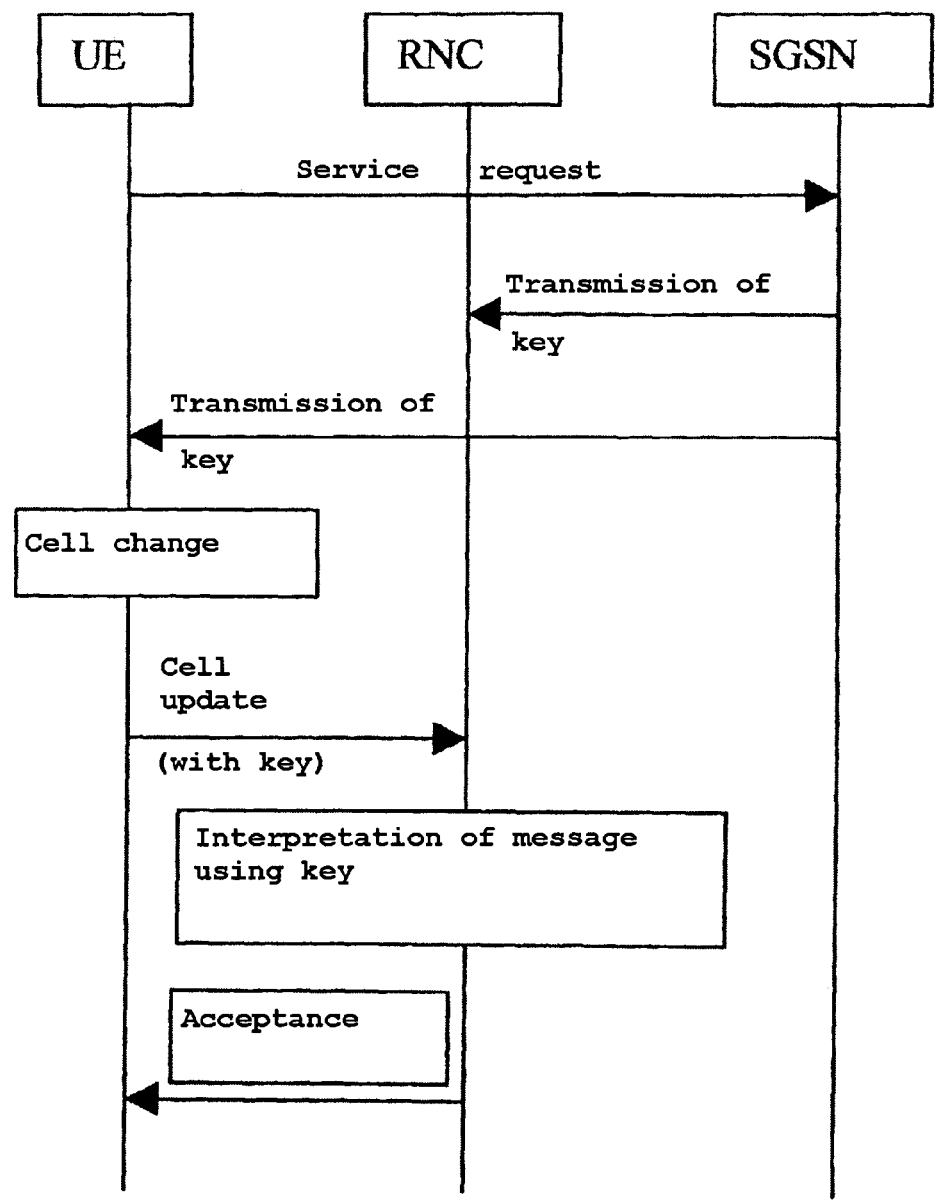
FIG. 1 shows the signaling between the user station, the radio network control device and the access device of the core network.

Reference will now be made in detail to the preferred embodiments of the present invention, examples of which are illustrated in the accompanying drawings, wherein like reference numerals refer to like elements throughout.

FIG. 1 shows the signaling in respect of the use of a service by a user station (UE User Equipment) selected as an example. First the user station (UE) requests the service from the access device of the core network (SGSN Serving GPRS Support Node). The access device of the core network (SGSN) then transmits the key to the radio network control device (RNC Radio Network Controller). The access device of the core network (SGSN) also transmits the key to the user station (UE). The user station can then receive the useful information, as can other user stations as well (key assignment).

In the event of a cell change, the radio cell is updated by a cell update, with the user station also transmitting the service-specific key (with key) to the radio network control device (RNC). An interpretation is carried out at the radio network control device (RNC) using the service-specific key (interpretation of message with help key). Authorization to access the service for several users is acknowledged by the radio network control device (RNC) by the transmission of a message (Accept).

It is clear from this example that use of the key allows authorization to access or use a service to be verified for the user station (UE) in the radio network, without the radio network requiring user-specific information in respect of the service. The signaling outlay is therefore kept low.

The invention claimed is:

1. A method for transmitting useful information of a multimedia broadcast/multicast service in a radio communication system with at least one radio network control device and at least one base station forming a base station subsystem, the radio network control device being connected to an access device of a core network and the at least one base station being connected to at least two user stations via a radio communication interface, said method comprising:

holding a service-specific key, which is specific to the multimedia broadcast/multicast service and which includes authorization to use the multimedia broadcast/multicast service, by both the radio network control device and the at least two user stations, the service-specific key not including any specific information about the at least two user stations;

receiving at the radio network control device a received key from at least one of the at least two user stations; and transmitting the useful information of the multimedia broadcast/multicast service to the at least one user station, only if a verification carried out by the radio network control device solely based on the received key shows that the received key corresponds to the service-specific key.

2. A method according to claim 1, wherein the access device of the core network transmits the service-specific key to both the radio network control device and the at least two user stations upon initiation of the multimedia broadcast/multicast service.

3. A method according to claim 2, further comprising transmitting the service-specific key via a user-specific radio channel from the base station to the at least two user stations.

4. A method according to claim 3, further comprising registering with a different radio network control device by one of the at least two user stations using the service-specific key, upon a cell change by the one of the at least two user stations to a different radio cell assigned to the different radio network control device.

5. A method according to claim 4, wherein said holding of the service-specific key by radio network control devices indicates that the multimedia broadcast/multicast service is offered via the core network in the radio network control devices which support the multimedia broadcast/multicast service.

6. A method according to claim 5, wherein the service-specific key is one of a temporary key and a permanent key.

7. A radio communication system for transmitting useful information of a multimedia broadcast/multicast service to several user stations, comprising:

a core network, including at least one access device;

at least two user stations, each including a storage unit holding a service-specific key which is specific to the multimedia broadcast/multicast service and which includes authorization to use the multimedia broadcast/multicast service and not including any specific information about said at least two user stations; and a base station subsystem, including at least one base station, connected to said at least two user stations via a radio communication interface, including a storage unit holding a service-specific key which includes authorization to use the multimedia broadcast/multicast service, and at least one radio network control device, connected to the at least one access device of said core network, receiving a received key from at least one of the at least two user stations, verifying, solely based on the received key, that the received key corresponds to the service-specific key, and transmitting the useful information of the multimedia broadcast/multicast service to the at least one user station only if the received key is verified.

8. A radio communication system according to claim 7, wherein the access device of said core network transmits the service-specific key to both said radio network control device and said at least two user stations upon initiation of the multimedia broadcast/multicast service.

9. A radio communication system according to claim 8, further comprising means for transmitting the service-specific key from said at least one base station to said at least two user stations via respective user-specific radio channels.

* * * * *